United States Patent Office 3,263,186
Patented July 26, 1966

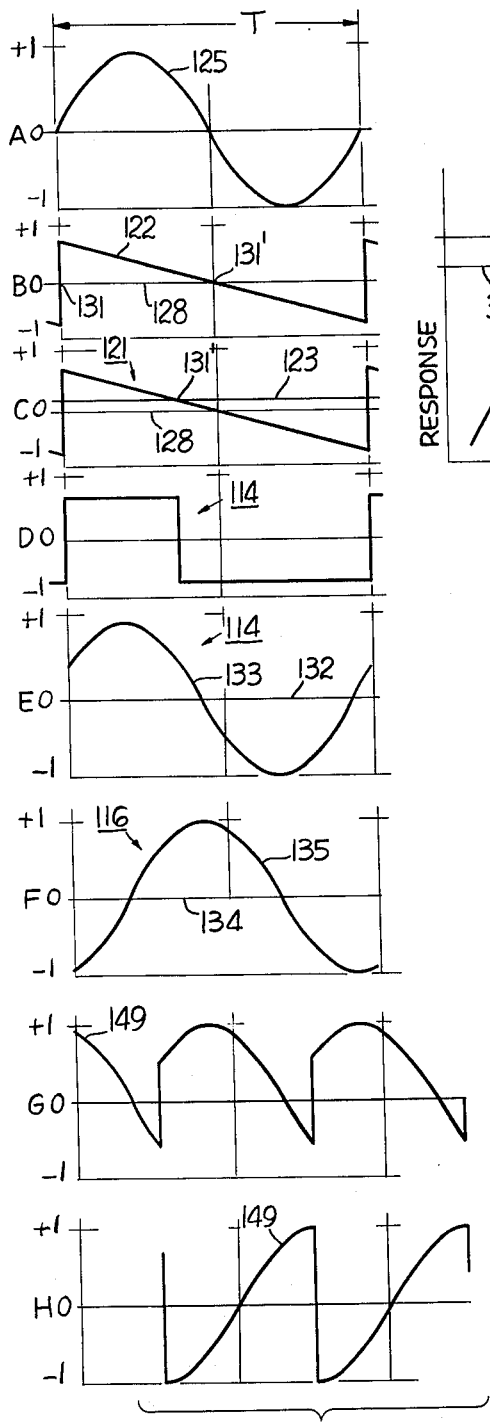
Fig. 7
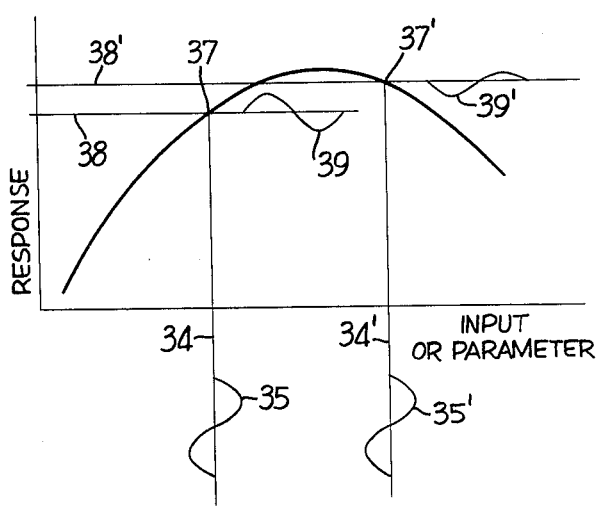
Fig. 2
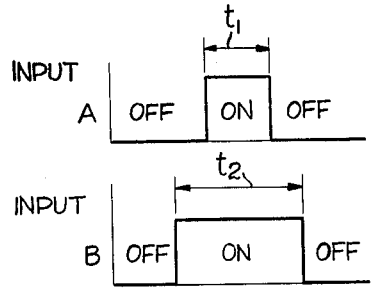
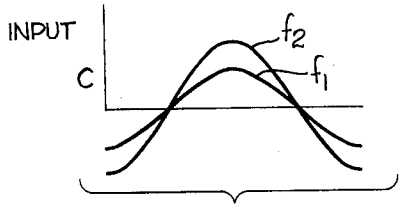
Fig. 4

3,263,186
ADAPTIVE CONTROL WITH PULSE
WIDTH MODULATION
Panait Paul Calcai, Madison, Wis., assignor to Allis-
Chalmers Manufacturing Company, Milwaukee, Wis.
Filed Sept. 12, 1963, Ser. No. 308,448
10 Claims. (Cl. 332—14)

This invention relates generally to an adaptive control; more specifically to an adaptive control that uses a pulse width modulation technique.

*Introduction to adaptive controls*

The control of this invention senses the output of a system and adjusts the input or an internal parameter of the system to maintain a desired output. To this extent the adaptive control is like many well known feedback controls; before discussing adaptive controls further, it will help to consider a simple example of a nonadaptive feedback control, the position follow up. A position follow up control senses the position (output) of a system, compares the actual position with a reference position, and produces an error signal that indicates the distance (magnitude) and the direction (polarity) of the system position from the reference position. Other components of the follow up control adjust the input or an internal parameter of the system to cause the system to change its position in the direction of the reference position. For such a system and control, it seems to go without saying that the polarity of the error signal indicates the proper direction to change the input or internal parameter without any ambiguity. This invention is about a control for systems in which the polarity of the error signal ambiguously indicates the proper direction to change the input. An object of this invention is to provide an improved control that uses adaptive techniques to establish the proper relation between error direction and the direction to change the input or internal parameter.

For a system having an output that presents a maximum or a minimum as a function of the input or an internal parameter, an error signal is identical for pairs of operating points located on opposite sides of the peaked curve that relates the system input and output. The control must somehow take into account whether the system is operating to the right or the left of the peak because the polarity of the slope of the curve establishes the relation between the direction of a change in the input and the direction of the resulting change in the output.

One straight forward way to determine the slope polarity is to change the parameter in either direction only slightly and to observe whether or not the output improves. A person manually trimming up the parameters of a system might go through this process. If raising the input or a parameter slightly improved the output, he would keep raising it so long as the output kept improving. If raising did not improve the output, he would lower the input or parameter and observe whether this improved the output. If it did not, he would conclude that the system was already operating at its optimum point. If it did improve the response, he would keep decreasing the input or parameter until he found the optimum. Some controls automatically go through this process by periodically perturbing the value of an input or parameter and observing whether the resulting ripple in the effective value of the output is in phase with the perturbation (positive slope) or out of phase with the perturbation (negative slope).

Well known adaptive controls superimpose a small sinusoidal ripple called a perturbation signal on the normal value of the input or a parameter of the system. A corresponding ripple appears at the system output. When the system is operating on the positive slope of its curve, the ripple in the output is more or less in phase with a perturbation in the input or parameter. When the system is operating on the negative slope the ripple in the output is about 180° out of phase with the ripple in the input or parameter. Thus, except for other phase shifts between the input and output, the phase relationship of the input and output ripples indicates the polarity of the slope of the curve where the system is operating and thereby indicates the proper relation between the direction of a change of response of the system and the appropriate direction to change the input or parameter.

Most systems have capacitance or inductance or analogous characteristics that can introduce an additional phase difference between the sinusoidal input and the resulting sinusoidal output. For small sinusoidal perturbation signals of a given frequency, this additional phase difference is substantially constant over a wide range of operating points on the nonlinear curve of the system. The additional phase shift of most systems can be determined either theoretically or experimentally. The problems of the additional phase shift will be discussed further in the description of the invention.

*Introduction to the invention*

The control of this invention is intended to operate control devices of the type that have only two states. A valve that is either turned on or turned off is an example of such a device. Switching the valve on and off establishes an average or effective value somewhere between full on and full off. In a fuel cell, for example, fuel cell moisture decreases while a valve is turned on to supply hydrogen fuel, and the moisture increases while the valve is turned off. If the valve is turned on and off fast enough (e.g., one cycle per minute), an internal parameter, moisture, and the output, voltage, will vary only slightly about an average value.

The terms "on" and "off" are abitrary because for some systems they might be interchanged or one or both states might be only partly on or partly off. For some control devices, there is specialized terminology such as open and closed. In this description the terms ON and OFF will express this generality.

The control of this invention performs the ON–OFF switching periodically as follows. During a fixed period of time T, the control device is switched ON for a selected portion $t$ of the period T. The length of the ON time $t$ is varied within the fixed period T in response to an adaptive signal. Thus, the average time that the control device is on over a number of cycles of the period T is somewhere between full ON and full OFF, depending on the ON time $t$ that is established by the adaptive signal. This technique for varying the average value of the state of the control device can be thought of as a pulse width modulation technique.

The periodicity in the input or in a parameter and the corresponding periodicity in the output can be represented by a Fourier series containing a constant term and a harmonic series of ripples. The fundamental frequency of the ripples equals the frequency of ON–OFF switching and the higher harmonics are multiples of this frequency. One of the advantages of the control as it has been described so far is that it operates a single control device to produce both the average value of the parameter or input and the sinusoidal perturbation.

The control filters out the constant term and all the harmonics from a system output signal, and it compares the remaining fundamental frequency component of the output with the corresponding component of the input or parameter ripple. From this comparison the control produces an adaptive signal that indicates which side of the peak the system is operating on. The control uses the adaptive signal to adjust the ON time $t$ to operate the system at its peak output.

As has already been suggested, adjusting the ON time $t$ can give the output ripple other phase shifts besides the phase shift associated with the slope polarity. This will be explained in the description of a second embodiment of the invention which does introduce such an additional phase shift; it is an advantage of the second embodiment that it is tolerant to additional phase shifts over a wide and useful range. The preferred embodiment of this invention generates the ON time signal in a way that prevents the control from producing an additional phase shift in the output. To avoid additional phase shifts, the preferred control maintains the center of the ON time at the center of the period T. A Fourier analysis of the ON–OFF switching wave form would show that the fundamental remains in phase with the ON–OFF switching sequence, of period T, without regard to the length of the ON time; only the amplitudes of the fundamentals vary with the ON time $t$.

One advantage of this control is that it can be used with very simple control devices such as solenoid operated valves that have only two positions or electron tubes or the like that operate in the switching mode.

Another advantage of this control is that the wave form that is applied to the control device is very simple and is easy to generate by various well known electrical, mechanical and analogous devices.

Another advantage of this control is that it is not necessary to know much about the system except that its output has some maximum or minimum with respect to the input or to the parameter and to know the phase relationship between the perturbation ripple and the output ripple.

The detailed description of the invention will suggest other advantages and objects of the invention.

The drawing

FIG. 2 is a curve showing the characteristics of part of the controlled system of FIG. 1;

FIG. 3 is a series of wave forms associated with the control and the system of FIG. 1;

FIG. 4 is another series of wave forms associated with the control of FIG. 1;

FIG. 7 is a series of wave forms associated with the system and control of FIG. 6.

The controlled system

Figure 1:
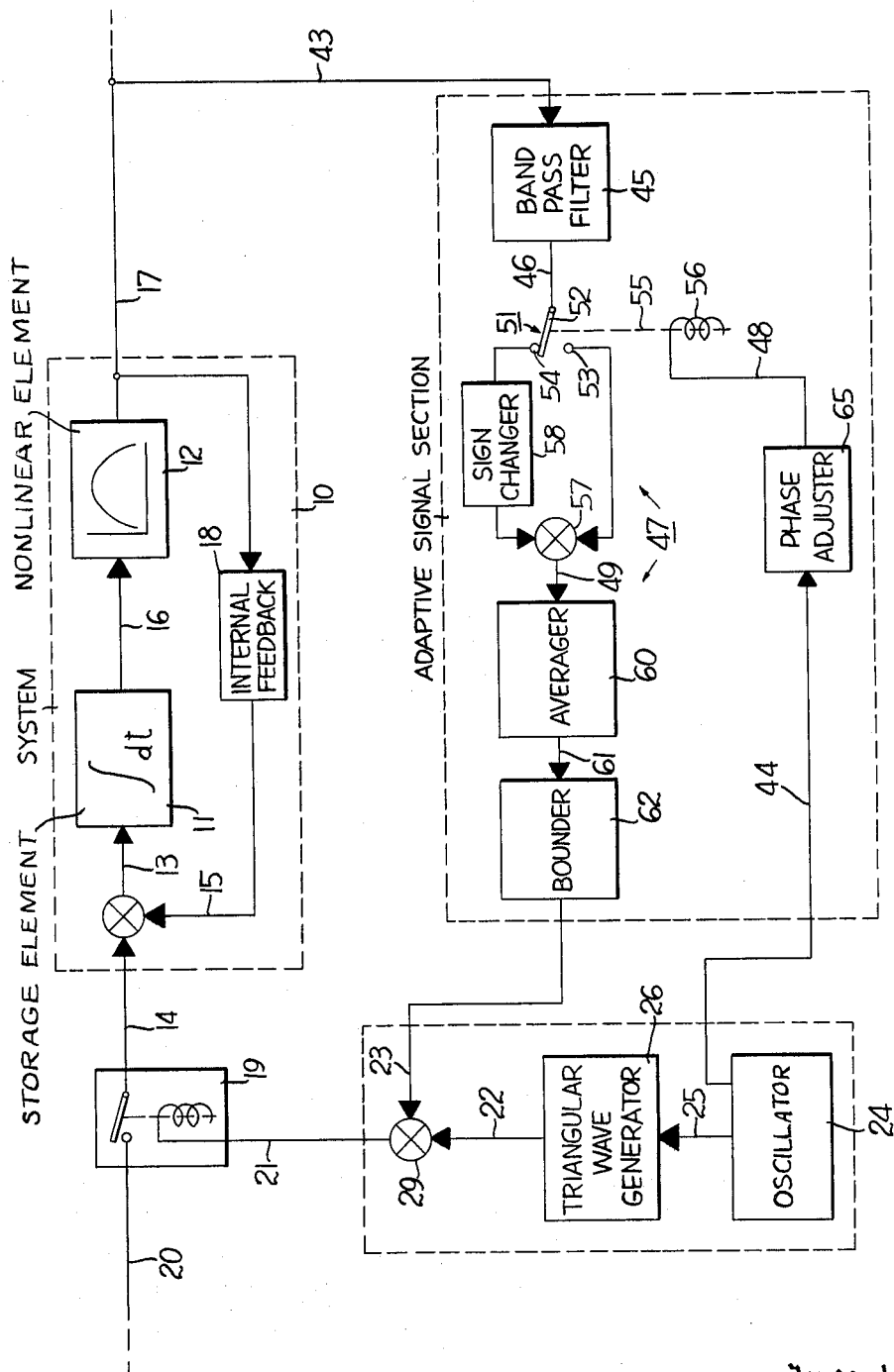
FIG. 1 is a schematic diagram of a system and the preferred embodiment of the control of this invention.

FIG. 1 shows a simple example of a system 10 to which the control of this invention is applied. System 10 has a storage element 11 that is represented by an integration symbol in box 11 and it has a nonlinear element 12 that is represented by a curve that is shown in more detail in FIG. 2. Element 11 receives an input 13 that is made up of an input 14 to the system and an internal feedback input 15. In response to its input 13 element 11 produces an internal parameter 16. Element 12 responds to parameter 16 to produce the system output 17. System 10 also has an internal feedback loop that includes a box 18 which receives a measure of system output 17 and produces the feedback input 15 to box 11. A control device 19 is connected to a source 20 (shown as a line) of the input to system 10 and turns ON and OFF in response to switching signal 21 (described later) to pulse width modulate input 14.

System 10 can be thought of as a fuel cell. In the example of a fuel cell, line 20 is a supply of hydrogen fuel; control device 19 is a solenoid operated valve that turns ON in response to a positive (arbitrary) signal at line 21 and turns OFF in response to a zero or negative value signal; line 14 represents the ON–OFF flow of hydrogen to the fuel cell and thus also represents the rate that the hydrogen removes moisture from the fuel cell; feedback input 15 represents the rate that the fuel cell forms moisture, input 13 is the difference between the two rates 14, 15; element 11 represents the action of the fuel cell in accumulating the moisture according to difference between the rate that it is formed and removed; line 16 represents the resulting amount of moisture in the fuel cell; line 17 represents the terminal voltage (neglecting the internal voltage drop) and element 12 represents the relation of the voltage 17 to moisture 16; box 18 represents the relation between terminal voltage and current and between current and the moisture forming rate. Lines 14 and 20 also represent the hydrogen supply piping system, and line 17 also represents electrical conductors.

The switching control

As FIGS. 1 and 3 show, switching signal 21 has two components, a periodic signal 22 and a bias signal 23. Bias signal 23 is generated and adjusted by the adaptive signal section described later; it is shown as time invariant for the single period T of FIGS. 1 and 3C.

To provide a constant phase reference for sinusoids throughout the control and the system 10, the control preferably includes a reference oscillator 24 that produces at its output 25 a periodic reference which FIG. 3A shows as a sine wave. A triangular wave form generator 26 is connected to receive reference 25 and to produce at its output 22 a triangular wave form as shown in FIG. 3B. Triangular wave 22 of FIG. 3B is kept in constant phase relationship with the reference 25 of FIG. 3A. Preferably (but not necessarily) triangular wave 22 alternates in polarity symmetrically about its zero axis 28. An adder 29 (such as an amplifier with two sets of input terminals) receives triangular wave form 22 and bias signal 23 and produces as its output the switching signal 21 shown in FIG. 3C. Wave form 21 of FIG. 3C is similar to wave form 22 of FIG. 3B except that the bias component 23 may make the triangular component 22 unsymmetrical about the zero axis 28 as FIG. 3C illustrates. Control device 19 is made to turn ON in response to the positive portion of switching signal 21 and to turn OFF in response to the zero and negative portions of the signal to give system input 13 the wave form of FIG. 3D. (In other words, FIGS. 3C and 3D equivalently represent switching signal 21.)

The frequency of the periodic waves 22 and 25 is chosen to be high enough that bias signal 23 will vary rather slowly with respect to periodic signal 22. The maximum possible rate of change of bias signal 23 depends on the speed of response of system 10 to changes at its input 14 and on the speed of response of the adaptive signal generating section in producing a change in bias signal 23. The speed of response of system 10 can be calculated or determined by tests. Ordinarily there is no limitation to prevent choosing the switching frequency high enough with respect to changes in the bias signal. Consequently bias signal 23 can be considered to have a constant magnitude during a single period, as FIG. 3 shows.

The functional description of the components of the switching control section should suggest various devices to make up the switching control section. In the example of a fuel cell, where the switching frequency may be 1 to 10 cycles per minute, the components may be simple electromechanical devices. Oscillator 24 may be an electric motor driven at a constant appropriate speed; the angular position of its shaft corresponds to periodic signal 25. Triangular wave generator 26 may comprise a circular potentiometer having its two end terminals connected to a common point of positive potential and having a mid-tap connected to a point of negative potential. Output 22 appears between the ground and the potentiometer slider as the slider is driven by the shaft 25 of motor 24. For a system 10 that might use a higher switching frequency there are many well known devices suitable to produce signal 22.

*Operation of the switching control*

As FIG. 3C indicates, the magnitude and the polarity of bias signal 23 establishes the zero crossing points 31, 31' of the triangular wave component 22 of switching signal 21. Raising bias signal 23 (i.e., making it more positive) advances the turn ON point 31 and retards the turn OFF point 31' symmetrically with respect to the mid-point of period T and thereby lengthens the ON time $t$. Similarly, decreasing bias signal 23 (i.e., a negative going change) retards turn ON point 31 and advances the turn OFF point 31' symmetrically with respect to the mid-point of period T and thereby widens the ON time $t$.

As will be explained later, bias signal 23 has a component that is varied in polarity and magnitude according to the slope at the operating point on the curve shown in functional box 12 of system 10.

The ON-OFF switching of device 19 in response to signal 21 gives system input 14 the rectangular wave form shown in FIG. 3D. As FIG. 3E shows, the Fourier series of this rectangular wave includes a constant 32 (i.e., it varies slowly and aperiodically) that represents the average value of input 14; it also includes a fundamental cosine term 33 having the same frequency as reference sinusoid 25 and the triangular wave 22. The Fourier series also includes higher frequency terms; the control suppresses these terms and they will not be considered in this description of the operation of the switching control.

FIG. 4 illustrates the relation between the ON time $t$ and the phase and the magnitude of the fundamental Fourier component of the wave form of input 14. In FIG. 4A the control produces a rather short ON time $t$–1 and in FIG. 4B the control produces a longer ON time $t$–2. FIG. 4C shows the fundamental term $f$–1 in the Fourier series for the switching wave form of ON time $t$–1 and the fundamental $f$–2 for the ON time $t$–2. Although the amplitudes of the two fundamentals differ, they are in phase. Therefore the phase of signal 21 and the resulting fundamental Fourier components throughout the system and the control are independent of the width of ON time $t$. The maximum amplitude occurs when the ON time and OFF time are equal; the amplitude is zero if either the ON time or the OFF time are zero, even when ON and OFF represent only partially on or off.

*Response of the system to the switching signal*

FIG. 2 illustrates the response of system 10 to the rectangular wave form of FIG. 3D. This wave form comprises the average value term 32 and a fundamental Fourier component 33 of FIG. 3E. (It also comprises higher harmonics that are not significant in this explanation because they are suppressed in the adaptive section of the control.) Storage device 11 receives average value term 32 and fundamental term 33 in input 14. It may also receive internal feedback inputs (such as 15 in FIG. 1) that more or less cancel the average value term to give parameter 16, the integral of these inputs, an average value 34 that varies within the range indicated by the horizontal axis of FIG. 2. Average value term 34 is substantially invariant in the period T as FIG. 2 represents. In integrating fundamental term 33 of input 13, element 11 gives parameter 16 a ripple 35 that is retarded by 90° with respect to the input fundamental 33 as FIG. 3F illustrates. With the internal feedback loop, system 10 may produce a phase shift between input 14 and parameter 16 that is different from 90°.

FIG. 2 shows the nonlinear characteristic of system element 12 in detail and illustrates the response of element 12 to parameter 16. Suppose that system 10 is for some reason operating at point 37 where parameter 16 has an average value 34 and a ripple 35 (see FIG. 3F) and output 17 has a corresponding average term 38 and ripple 39 (see FIG. 3G). Because point 37 is on the positive slope of the curve, output ripple 39 is in phase with the parameter ripple 35.

FIG. 2 also illustrates the relationship between parameter 16 and its components and output 17 and its components when system 10 operates to the right of the peak on the negative slope of the curve at point 37'. Primed numbers 34', 35', and 38' and 39' identify average values and ripples corresponding to similarly numbered values in the example of operating on the positive slope. When system 10 operates on the negative slope, the fundamental 39' of output 17 is 180° out of phase with the fundamental 35' of parameter 16. When system 10 operates at the peak of the curve of FIG. 2, the output fundamental 39 or 39' is substantially zero. Thus, the phase of ripple 39 or 39' of output 17 (with respect to ripple 35 or 35' of parameter 16) indicates the polarity of the slope of the curve where the system is operating; the slope polarity in turn indicates whether control should increase or decrease the average value 32 of input 14 to increase output 17 to its optimum.

For most systems, the magnitude of ripple 39 or 39' also contains useful information. The magnitude of ripple 39 or 39' in output 17 depends on the magnitude of the slope of the curve; in the curve of FIG. 2 and for many physical systems the slope of the curve increases with the distance from the peak. In FIG. 2 the magnitude of ripple 39 is higher than the magnitude of ripple 39' because the slope is steeper at operating point 37 than at operating point 37'. Thus, the magnitude of ripple 39 or 39' in output 17 indicates generally whether the control should make a large or small change in the ON time to move the operating point to the peak of the curve.

The adaptive signal section of the control which will be described next, generates a suitable phase reference and senses the phase of the ripple 39 or 39' in output 17 with respect to the phase reference to establish the proper direction to change bias signal 23.

*The adaptive signal section*

The adaptive signal section of this control receives a measure 43 of system output 17 (including the average term 38 or 38', fundamental 39 or 39', and higher harmonics) and a phase reference signal 44, and it operates on these signals to give bias signal 23 the appropriate magnitude and polarity. A band pass filter 45 receives signal 43 and produces at its output 46 the fundamental term 39 or 39'. Techniques for designing electrical band pass filters centered to transmit a selected frequency are well known.

A phase sensor 47 receives fundamental signal 39 or 39' at output 46 and a signal 48 derived from reference 44, and it produces an output 49 that indicates the slope of the curve at the operating point. Phase sensor 47 may comprise a switch 51 having an arm 52 that is moved between two stationary contacts 53, 54 by an operating element 55. Phase sensor 47 also includes a relay 56 that actuates element 55 to change position each half cycle in response to signal 48. Stationary contact 53 is connected to a summing point 57 to give point 57 the polarity of output 49, and contact 54 is connected to summing point 57 through a sign changer 58 to give point 57 the opposite polarity from output 49. Sign changer 58 may be considered to represent the physical interchange of wires for polarity reversal or to represent functionally equivalent devices such as an amplifier which changes the polarity of its input signal.

FIG. 3G, the wave form at output 46, and FIG. 3I, the wave form of output 49 illustrate the operation of the phase sensor when the system is operating on the positive slope of the curve of element 12 (and the sinusoid 39 of FIG. 3G differs in phase from sinusoid 33 of FIG. 3E only by the phase shift associated with box 11 and the internal feedback loop). During the half cycle when arm 52 is positive, it is switched to stationary contact 53 and it gives output 49 the positive polarity of output 46. During the next half cycle when output 46 is negative, arm 52 is connected to stationary contact 54 so that the output 49 is made positive, the opposite polarity from output 46. FIG. 3H, the wave form at output 46 when the system is operating on its negative slope, and FIG. 3J, the corresponding wave form at output 49, show the converse operation when system 10 is operating on the negative slope of the curve of element 12. Because the phase is reversed at output 49, output 49 becomes negative.

An averager 60 is connected to summing point 57 to receive the rectified wave form of FIG. 3I when the system is operating on the positive slope and of 3J when the system is operating on its negative slope. Averager 60 produces a relatively smooth signal of the same polarity at its output 61. This signal is substantially time invariant within the switching period T. Averager 60 may comprise a low pass network of resistors and capacitors or inductors. Preferably, averager 60 also includes an amplifier connected to amplify the output with respect to the input.

Preferably a bounder 62 is connected to receive output 61 of averager 60 and to limit the magnitude of its output, bias signal 23. Preferably, as will be explained later, the bias signal is never large enough to maintain control device 19 either full ON or full OFF continuously.

Preferably, the adaptive signal section includes amplifiers that are not specifically shown but may be considered to be part of band pass filter 45, averager 60, or bounder 62. The amplifiers provide a high gain in the adaptive loop so that a small variation in the operating point from the peak of the curve of FIG. 2 produces a large increase or decrease in the ON time to correct the error in the value of parameter 16.

As the adaptive signal section has been described so far, it has been assumed without explanation that switch operating signal 55 is in phase with the ripple 35 in output 46. The control generates signal 55 from output 25 of oscillator 24 (or from other suitable oscillatory components of the system). Phase reference 44 is a measure of oscillatory signal 25. A phase adjuster 65 is connected to receive reference 44 and to produce a signal at its signal 48 that corresponds to ripple in output 46. Design techniques for connecting arrays of resistors, capacitors or inductors to form any desired phase shift for any usable frequency are well known. Signal 48 actuates relay 56 to one position on one half cycle of signal 48 and to the other position on the other half cycle.

For most systems, the phase shift between the input 14 and the output 17 is substantially constant for any operating point on the curve of FIG. 2 (except for the phase reversals corresponding to slope polarity). Any phase shifts that the control introduces are also substantially constant. These phase shifts are calculated or determined by experiment, and phase adjuster 65 is set to introduce a corresponding phase shift between reference 44 and signal 48. Even if the phase shift is not substantially fixed, or if its not accurately known, the control will perform satisfactorily within a wide range as will be discussed later.

Operation

Figure 5:
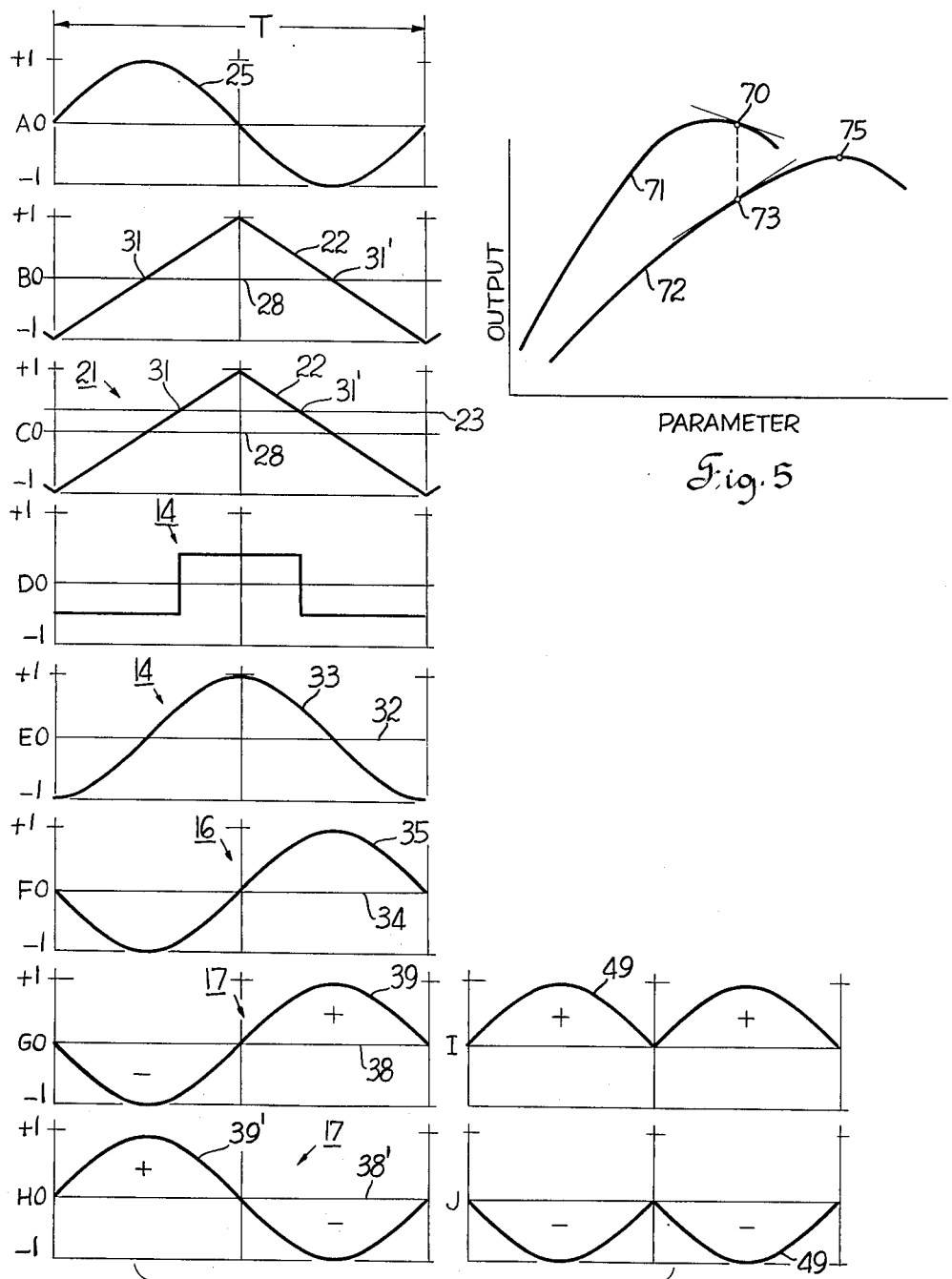
FIG. 5 shows two curves representing a change in the system of FIG. 1 and illustrating the operation of the control.

Suppose that system 10 is operating at a point 70 slightly to the right of the optimum point on the negative slope of curve 71 in FIG. 5 and some condition causes system 10 to change to curve 72. The wave forms of FIGS. 3A, B, C, D, E, F, H and J represent the steady state operation of system 10 on curve 71 before the change to curve 72. System 10 starts operating on curve 72 with these same steady state conditions before the control has started to correct output 17. As FIG. 5 shows, the operating point first moves along in a vertical line of constant value or parameter 16 from point 70 to a point 73 that is on the positive slope of curve 72. With this change in slope polarity, the fundamental of output 15 reverses in phase from the wave form 39′ of FIG. 3H to wave form 39 of FIG. 3G. It also increases in magnitude because the slope magnitude at point 73 (shown by lines tangent to the curve) is steeper than the nearly flat slope near the previous optimum point 70. When the phase of fundamental 39′ reverses from FIG. 3H to FIG. 3G, the adaptive section makes the polarity of adaptive signal 23 positive (see FIG. 3I). Thus, bias signal 23 raises the triangular component of wave 23 and thereby increases the width of ON time $t$. With this operation, switching signal 21 holds control device 19 ON for a long portion of each period, and it increases the average value of input 14 and moves the operating point to the right on curve 72 in FIG. 5. Because system 10 is operating on the positive slope of curve 72, the increased value of parameter 16 moves the operating point of system 10 up the positive slope of curve 72 towards the new optimum 75. The adaptive loop is preferably given a high gain so it initially offers a large change in the ON time. As the operating point moves up the slope, the magnitude of the slope decreases and the magnitude of system output fundamental 39 decreases. Thus as the operating point moves up the slope, the adaptive section decreases the magnitude of bias signal 23 and thereby lowers the triangular wave and reduces the ON time of input 14. The operating point moves to the right of its initial point 73 on curve 72 and advances toward the peak 75. When the operating point reaches nearly the peak, a condition of equilibrium is established by the adaptive signal 23. Signal 23 settles at the appropriate value to keep control device 18 ON for the correct time $t$ to operate at about point 75.

The operating point may overshoot the peak. When this occurs, the adaptive section changes the polarity of bias signal 23 and thereby drives the operating point back up the curve towards the peak from the other side. The gain of the adaptive loop, which controls the speed of response of the adaptive control, can be adjusted to limit the amount of overshoot by well known design techniques.

As the control and its operation have been described so far, the triangular wave form 22 is symmetrical about its zero axis 28 when bias signal 23 is zero (arbitrary). Thus, when the bias signal is zero, the symmetrical triangular wave form 22 of FIG. 3B would make the ON and OFF times of control device 19 equal. When system 10 operates on its positive slope as on curve 72, bias signal 23 is positive, and the ON time is made longer than the OFF time. Conversely, when the system is operating on its negative slope as on curve 71 and bias signal 23 is made negative, the ON time is made longer than the OFF time.

A second embodiment of the switching control

Figure 6:
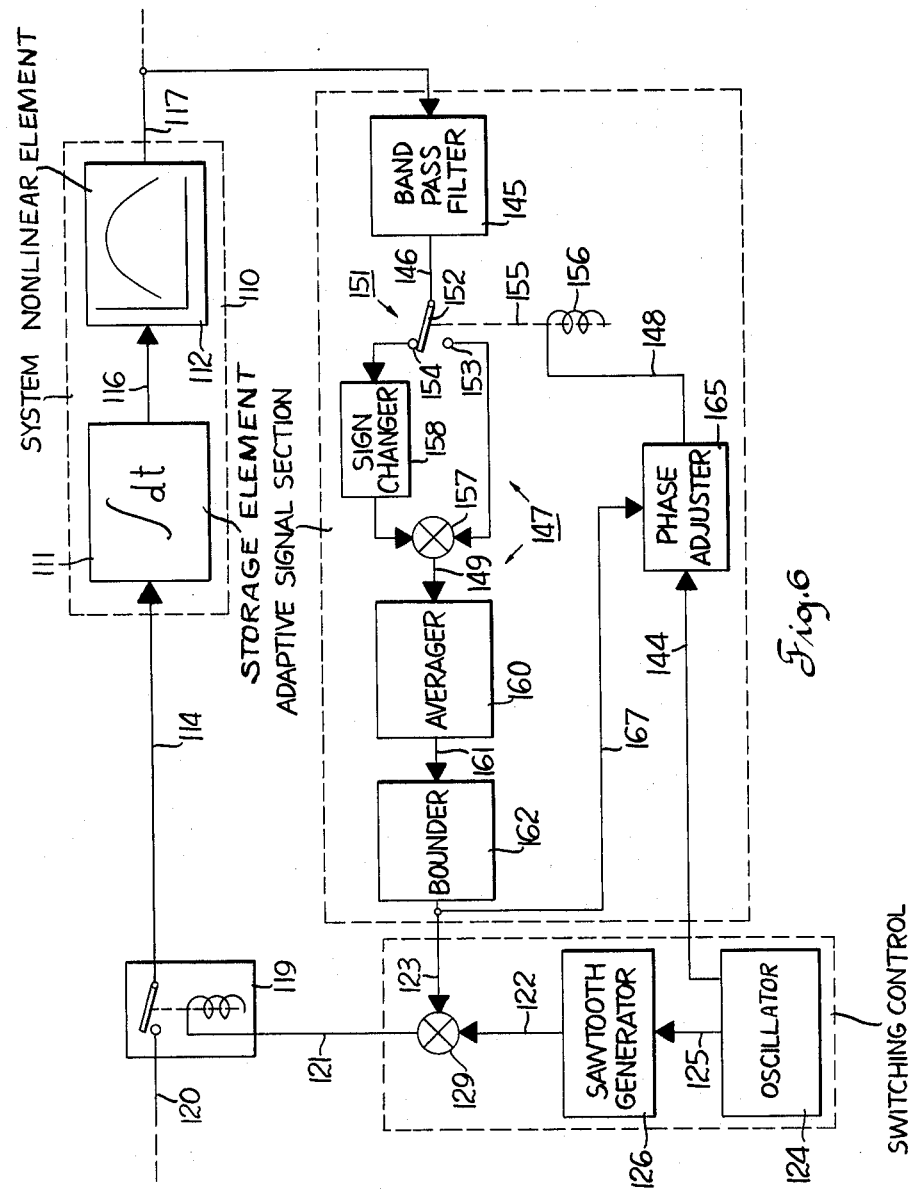
FIG. 6 is a schematic diagram of a control of a second embodiment of the invention and the system of FIG. 1 somewhat simplified.

FIG. 6 shows a control that generates a switching wave form that varies in phase as the ON time is changed. The control and the system are generally similar to FIG. 1 and identifying numbers are in a 100 series that parallels the numbering of FIG. 1. System 110 of FIG. 6 is identical to the system of FIG. 1 except that its internal feedback loops are not shown.

The switching control section of FIG. 6 differs from the switching control section of the preferred embodiment by having a saw tooth generator 126 where the preferred embodiment has a triangular generator. Saw tooth generator 126 may comprise a potentiometer having a fixed mid-tap connected to a point of reference potential, one end terminal connected to be positive and the other connected to be negative. As the slider is rotated continuously by shaft 125, saw tooth 122 appears between the slider and the reference point. For a higher frequency saw tooth many well known circuits are suitable. FIG. 7A shows the wave form of oscillator output 125 as a phase reference for other wave forms of FIG. 7. The saw tooth signal 122 of FIG. 7B decreases in magnitude throughout period T. Saw tooth wave form 122 and bias signal 123 combine as FIG. 7C shows to vary the second zero crossing point 131'; the first zero crossing point 131 remains at $t=0$. Thus, as FIG. 7 shows, the saw tooth wave form causes the ON switching action of signal 121 and input 114 to begin always at the beginning of each period T and the switching control operates in response to bias signal 123 to vary only the OFF switching action. A Fourier analysis of the rectangular wave form of FIG. 7D would show that saw tooth 122 is in phase with oscillator signal 125 only when it is symmetrical about its horizontal axis 128. The fundamentals of input 114, parameter 116 and output 117 that are derived from saw tooth wave signal 122 are advanced in phase with respect to reference signal 125 when the ON time is shorter than the OFF time and they are retarded when the On time is longer than the OFF time as FIG. 7 shows.

With this shift in phase, phase comparator 147 no longer operates in the simple mode described for the preferred embodiment. If the switch actuating signal 155 is somewhat out of phase with output fundamental 39 or 39', fundamental 39 or 39' at output 146 changes polarity while switch element 152 is still at the same contact position 153 or 154 and the wave form of FIG. 7G at point 157 would have a portion of opposite polarity at each half cycle. These opposite polarity portions of the wave form subtract from the proper polarity portions in averager 160 and thereby could reduce the magnitude of bias signal 123. Preferably, the adaptive loop is given a high enough gain that the maximum value of bias signal 123 that is permitted by bounder 162 appears whenever the operating point is more than slightly away from the peak of the curve of FIG. 2. As will be explained next, averager 160 produces the correct polarity signal even with the maximum possible phase shift that can be produced by varying the ON time.

When saw tooth 126 is biased to maintain control device 119 OFF almost all of the time, the ripples in input 114, parameter 116 and output 117 would have almost a 90° phase lead and the average value 131 of signal 113 would be almost zero. With the 90° phase lead, phase comparator 147 would switch the polarity of the fundamental signal exactly in the middle of each portion. The resulting wave form at adder 157 (FIG. 7H) would cancel in averager 160. Thus, the point of maximum phase advance, 90°, coincides with the limit at which the phase comparator can satisfactorily distinguish between positive slope ripples and negative slope ripples. For the same reason, if the control were operated to turn ON for almost the full period, the fundamental of input 114, parameter 116 and output 117 would be retarded by almost 90° and the output of averager 160 would be almost zero because the opposite polarity portions of each half cycle of the fundamental would almost cancel in averager 160. Thus, the control of FIG. 6 gives bias signal 123 the proper polarity in spite of phase shifts associated with varying the ON time over substantially the full range of varying the ON time. Preferably, bounder 162 is set so that bias signal 123 is never given enough magnitude to keep control device 119 either ON or OFF for a full period. A practical operating range for many systems is between ⅕ and ⅘ of the period T.

The control of FIG. 6 to some extent varies bias signal 123 and the ON time in response to the phase shifts produced by varying the ON time. This occurs partly because these phase shifts vary the magnitude of the ripple in input 114, parameter 116 and output 117 (which is true of the control of FIG. 1 also) partly because the switching reference may be out of phase with fundamental 139 or 139' as has been explained. However, the adaptive loop can be given high gain so that the adaptive signal 123 is large enough to provide the desired speed of response even when a phase shift decreases its magnitude somewhat. Preferably, signal 123 is at the limit set by bounder 162 except when the operating point is near the peak of the system curve. For most systems, other parameters can be adjusted so that the peak of the curve corresponds to approximately the mid range of ON-OFF switching times. For example, in a fuel cell the pressure of the hydrogen supply 20 can be adjusted to control the ON-OFF switching times that the control ordinarily produces.

The control of FIG. 6 includes means to compensate for phase variations. It includes a phase adjuster 165 that may be a well known device that produces a variable phase shift in proportion to a voltage input. In the embodiment of FIG. 6 phase adjuster 165 receives an input 167 that is a measure of bias signal 123. Since bias signal 123 varies with the slope of the system curve (near the peak where bounder 162 does not limit signal 123) phase adjusting signal 167 appropriately varies phase adjuster 165 according to phase variations of switching signal 121. Even if the curve of element 12 of system 10 is not a parabola, signal 167 may be sufficiently linear with respect to the phase shift to compensate phase signal 149 satisfactorily, or a compensating network may be included in phase adjuster 165.

The preceding discussion about the fact that phase comparator 147 operates well in spite of phase shifts associated with ON time variations applies also to other phase differences up to 90° that may occur in the system or the control. The characteristics of system 10 may change slowly and produce a phase shift that is different from the originally calculated or measured phase shift. The curve of box 12 may change so that the system is operating in the region where the phase shift is to some extent a function of the operating point. The control still operates to maintain the system operating near its peak. Thus, it is not necessary to know very much about this system in order to adapt the control to a particular system.

Because phase comparator 147 can tolerate a wide difference in phase between reference 144 and the actual phase of the ripple of the parameter 16, the control might be made of components that are less reliable in phase than has been assumed in the description of these components.

*Other systems and other embodiments*

The two embodiments of the invention that have been described in connection with the fuel cell should suggest many systems that might use this control and appropriate components for the functional boxes of FIG. 1 and FIG. 6. The two embodiments have been described in the language of electrical components, but the control can be made up of mechanical, electromechanical, or other types of components. Further examples of the operation of the control and examples of the components will be suggested by substituting various specific control device state terms for the general terms ON and OFF and by interchanging the words in these pairs. The control is also useful with systems in which the quantity to be optimized is not the output 17 but some criterion of optimization that depends on the output. For example, the control can be adapted to optimize the mean squared value of output 17.

Some systems may require incorporating additional compensating networks of the standard type encountered in servomechanisms in order to be better suited for application of the adaptive controls. In the example of a fuel cell, it is sometimes desirable to operate on the dry side of the curve (to the right of the peak) to offset a sudden increase in moisture that follows an increase in load. For a system 10 without the internal feedback loop 18, the control of FIG. 1 would operate exactly at the peak of the curve of FIG. 2 even if the adaptive loop had only a small gain. (The speed of response of adaptive control would improve however if the gain was made higher.) With a system 10 having an internal feedback loop as FIG. 1 illustrates, a high gain in the adaptive loop is required to operate close to the peak. For such a system 10 a low gain will allow the system to operate off the peak; thus providing the appropriate gain, is one means for off peak operation.

Those skilled in the art will recognize other variations within the scope of the claims.

Having now particularly described and ascertained the nature of my said invention and the manner in which it is to be performed, I declare that what I claim is:

1. A control for a system having an input and an output and a control device operable between ON and OFF states to modulate the system input to adjust the value of the output, comprising, means for providing a periodic signal for switching the control device between its two states at two points in each period of said signal, said period being invariant and being appropriate to produce an average term and a ripple in the value of the input and in the value of the output, means responsive to the phase of the ripple in the output with respect to the phase of the ripple of the input and operable to produce a second signal indicating the direction to change the average value of the input for a desired output, and means responsive to said second signal to vary the periodic signal to adjust the ON time of said control device to adjust the average value of the input to the system in the appropriate direction for the desired output.

2. A control according to claim 1 in which said ON-OFF switching wave form is made phase invariant with respect to said periodic signal with variations in ON time.

3. A control according to claim 1 in which said periodic signal has a wave form that varies the phase of the fundamental in the ON-OFF switching of the input, the maximum phase variation being less than pulse or minus 90°, and said means responsive to the phase of the ripple in the output being differently responsive to two distinct 180° ranges of phase of the output, said ranges corresponding to the two slope polarities of a curve relating the system output to the input, whereby said control is substantially insensitive to variations in phase in the output associated with variations in ON time.

4. A control according to claim 3 in which said means responsive to the phase of the ripple produces a third signal varying in polarity according to the slope polarity of the system curve at the operating point of the system, said third signal varying in magnitude with slope magnitude except for errors associated with phase variations associated with ON time variations, and said means responsive to the phase of the ripple including means limiting said third signal magnitude to diminish the magnitude of said slope signal as the system operating point approaches the peak of the system curve in a region near the peak and to maintain a substantially constant value corresponding to a selected maximum and minimum value of ON time when the system is operating in a region away from the peak.

5. A control according to claim 4 in which said slope signal is an approximate measure of the variation in ON time and of the resulting variation in the phase of the fundamental term in the output ripple and said means responsive to the phase of the ripple in the output with respect to the phase of the ripple in the input includes a phase reference generator connected to receive a measure of said periodic signal and responsive to said slope signal to produce an output corresponding in phase to the phase of the fundamental of the input.

6. A control for a system having an input and an output and having a control device operable between ON and OFF states to modulate the system input to adjust the value of the output, comprising, means for providing a periodic signal having a triangular wave form for switching the control device ON at a zero crossing on one slope of said wave form and OFF at a second zero crossing on the other slope of said wave form, the period of said periodic signal being appropriate to produce an average term and a ripple in the value of the input and in the value of the output, means responsive to the phase of the ripple at the output with respect to the phase of the ripple of an internal parameter of the system and operable to produce a bias signal indicating the direction to change the average value of the input for a desired output, and means connected to receive said periodic signal and said bias signal to produce a switching signal having an ON time that is a function of the magnitude and polarity of said bias signal.

7. A control according to claim 6 in which said means responsive to the phase of the ripple includes a phase reference generator connected to receive a measure of said periodic signal and operable to produce a reference that is shifted in phase from said measure to represent the phase of the ripple in the system parameter.

8. A control according to claim 6 in which said bias signal varies in magnitude according to the slope magnitude at the operating point of a curve relating the system input and output and according to the gain of the control system, said control system having a gain to operate the system at approximately a predetermined distance from the peak of the system curve.

9. A control according to claim 6 including means to adjust the system input independently of the switch device, said means being adjusted to make the range of ON-OFF times correspond to a range of system operating points on a curve relating the system output to the system input.

10. A control according to claim 9 in which the operating point of the system on the curve establishes the polarity of said bias signal and the polarity of said bias signal establishes an available range of variation in the ON time, said adjustable means being adjusted to cause the control to operate the system on a preferred slope polarity of the curve.

References Cited by the Examiner
UNITED STATES PATENTS

| | | | |
|---|---|---|---|
| 3,072,864 | 1/1963 | Alexis et al. | 332—19 |
| 3,077,594 | 2/1963 | McKay et al. | 332—19 X |
| 3,090,929 | 5/1963 | Thompson | 332—14 X |
| 3,191,129 | 6/1965 | Feldman | 332—19 |

ROY LAKE, *Primary Examiner.*

A. L. BRODY, *Assistant Examiner.*